United States Patent [19]

Leistner et al.

[11] Patent Number: 5,143,501
[45] Date of Patent: Sep. 1, 1992

[54] GROOVED NAIL AND STRIP

[76] Inventors: Walter H. Leistner, 97 Alamosa Drive; Alfred S. Hertz, 77 Hillhurst Blvd., both of Toronto, Canada

[21] Appl. No.: 733,651

[22] Filed: Jul. 22, 1991

[51] Int. Cl.5 ............................................. F16B 15/08
[52] U.S. Cl. ................................... 411/442; 411/443; 411/452; 411/488; 206/343
[58] Field of Search ............... 411/442, 443, 444, 488, 411/451, 452, 922; 206/343, 344, 345, 338, 820

[56] References Cited

U.S. PATENT DOCUMENTS

| | | | |
|---|---|---|---|
| 1,360,344 | 11/1920 | Wood et al. | 411/452 |
| 2,940,081 | 6/1960 | Juilfs | 411/444 X |
| 3,152,334 | 10/1964 | Lingle | 411/442 X |
| 3,481,459 | 12/1969 | Becht | 411/444 X |
| 3,861,526 | 1/1975 | Leistner | 411/442 X |
| 4,637,768 | 1/1987 | Rabe | 411/452 |
| 4,679,975 | 7/1987 | Leistner | 411/443 |
| 4,815,910 | 3/1989 | Potucek | 411/443 X |

Primary Examiner—Rodney M. Lindsey

[57] ABSTRACT

A nail containing a predetermined unit weight of metal equivalent to a cylindrical nail having a predetermined diameter and having a shank of regular shape, a point at one end, at least two reduced portions formed in the shank longitudinally parallel to the central axis of the shank, having cross section reduced with respect to such a diameter, and a like plurality of ridges formed between the grooves, planar surfaces lying in planes parallel to one another, and, a head on one end of the nail, and at least two of ridges having ridge crests spaced apart a distance greater than the diameter of the equivalent cylindrical nail.

13 Claims, 5 Drawing Sheets

GROOVED NAIL AND STRIP

FIELD OF THE INVENTION

The invention relates to nails, and in particular to nails formed with longitudinal parallel reduced portions thereon, and longitudinal ridges, and to a stick of nails having such grooves for use in a nailing applicator.

BACKGROUND OF THE INVENTION

In the design of a nail for nailing into a wooden work piece, the principal critical factor is the so-called "holding power" of the nail in the work piece. Obviously, in the majority of nailing applications, it is desirable to provide a nail with the maximum possible holding power, i.e., resistance to pullout from the work piece. In the past, the majority of nails have been simple cylindrical wire nails having a predetermined diameter. Generally speaking, it has been understood that the greater the diameter of the nail, the greater is its holding power. However, the greater the diameter of the nail, the greater is the amount of metal incorporated in the nail, and thus the cost of manufacturing the nails is increased. Many proposals have been made in the past for attempting to provide a nail with increased holding power, for a given cross-sectional diameter of wire, as compared with a conventional cylindrical wire nail. These proposals have involved the use of various forms of knurlings or serrations, or other formations along the nail shank. These proposals are based upon the theory that the knurlings or serrations on the nail shank will somehow provide a more secure engagement with the fibres of the wooden workpiece. In practice, however, it has been found that they have produced very little, if any, increase in holding power. Another proposal has been the provision of a nail with a generally square cross-sectional shape, which is twisted longitudinally along its axis. These nails are known as "twisted wire" nails. These nails do in fact have an increased holding power. However, such nails present certain difficulties. In the first place, they are not always suitable for insertion by nailing applicator machines, since a nail of twisted wire preferably should rotate as it goes into the workpiece. Nailing applicators are not always capable of permitting the nail to rotate. In addition, the twisted wire nail presents an uneven configuration along its shank, and consequently it is not always easy to form such twisted wire nails into a nailing stick suitable for use in a nailing applicator machine.

Extensive research has been carried out by various research facilities, and by various companies into factors affecting the holding power of nails. As a result of this research, it has been substantially established that the principal factor affecting the holding power of a nail is simply the degree to which the wooden fibres are displaced transversely to i.e. "across", the axis of the grain of the wood. In other words, the general rule is that the greater the dimension of the nail, transverse to the axis of the grain, the greater will the displacement of the wood fibres, and the greater will be its holding power. Conversely, features of the nail parallel to the axis of the grain have little, if any, effect on its holding power.

There are also other factors which must be taken into consideration, in the particular case of nails designed for formation into nailing sticks for use in nailing applicators. Generally speaking, it is desirable that a nailing stick shall incorporate as many nails as possible in a given length of stick. This means that the nailing applicator can be used for a greater length of time before it is necessary to insert a fresh stick of nails. Obviously, if the nails are spaced apart a substantial distance between one another in the stick, then in a given length of stick, there will be a smaller number of nails. Thus, the nailing stick must be replaced more often. Thus, the downtime for the nailing applicator itself is increased, and the individual worker's output is reduced.

This factor is well understood, and in order to limit the spacing between the nails it has been customary to provide nails for nailing sticks, with "clipped" heads. In nails of this type, the nail head consists of a an incomplete circular formation, with an edge extending around an arc, and a linear side edge between the ends of the arc, which is essentially co-planar with the surface of the nail shank. In this way, the nail heads may be overlapped with one another, in the forming of the stick, and the shanks of the nails may be laid in contact with one another. This will produce a nail stick in which each nail is axially offset from the next adjacent nail by about the thickness of the head. The stick will thus have an essentially diagonal axis. Nailing applicators are designed to receive nailing sticks of this type, and such nailing sticks using "clipped" headed nails are common in the industry. One of the problems however associated with the use of such clipped heads is that they somewhat reduce the holding power of the nail. If such clipped heads are inserted, with the linear side edge of the head parallel with the longitudinal axis of the grain (i.e. along the grain), then there is a tendency for the holding power to be reduced, or, conversely, the nailing applicator will tend to force the nail too far into the workpiece. Either result is undesirable.

In one earlier proposal, nails having shanks of square cross-sectional shape, but without having an axial twist, have been used. These nails were formed with generally clipped heads, so that they could easily be assembled into a nailing stick with the sides of the nails abutting against one another and the heads overlapping. One of the disadvantages of this type of nail is that the square shape of the cross-section caused in effect a reduction in the holding power of the nail. The lateral dimension between the two opposite sides of the nail was less than the diameter of a cylindrical cross-section nail of an equivalent weight of wire. Consequently, there was a somewhat lesser degree of displacement of the wood fibres transversely of the axis of the grain, and a lower holding power resulted. In order to attempt to overcome this problem, teeth or notches were struck out from opposite sides of the nail, with the hope of providing a better hold on the wood fibres. In practice, however, this was found to be no more effective than the use of a cylindrically shaped cross-section.

In fact, the teeth or notches could actually reduce the holding power. Thus if the teeth or notches were formed with sharp or pointed ends, they would tear the wood fibre. Nevertheless some manufacturers still insist on achieving the sharpest possible teeth or notches.

Clearly, it is desirable to provide a nail particularly suitable for use in the formation of nailing sticks for use in nailing application, having a holding power which is increased as compared with a cylindrical cross-section nail of an equivalent weight of wire, and yet having a cross-sectional shape which may be easily formed into a nailing stick.

BRIEF SUMMARY OF THE INVENTION

With a view to satisfying the foregoing conflicting objectives, the invention comprises a nail, said nail containing a predetermined unit weight of metal per unit of length, equivalent to a wire nail having a predetermined diameter W and perimeter P and an equivalent unit length, and said nail comprising a shank portion having a predetermined length, and having a regular shape along its length defines a central axes with a first transverse axis X and a second transverse axis Y, a point at one end of said shank portion, four reduced portions on said shank portion extending longitudinally thereof from said point, and parallel to said central axis of said shank portion, said reduced portions being oriented to face between said X and Y axis and being diametrically spaced apart from on another and defining a dimension reduced relative to said predetermined diameter, W whereby to lie inside said perimeter P two of ridges formed between said reduced portions oriented to face along said X axis and defining ridge crest portions said ridge crest portions being spaced apart on opposite sides of said shank portion by a distance greater than said diameter W whereby to lie outside said perimeter P'', planar surface portions, on said shank portion lying in predetermined spaced planes parallel to, one another and oriented to lie along said Y axis, whereby a said planar surface portion of one said nail may lie against a planar surface portion of a next adjacent nail in a strip with said ridge crest portions extending from said shank outwardly from each said nail in said strip, on opposite sides of said strip, and, a head on said end of said nail remote from said point.

The invention further comprises such a nail, wherein said nail shank is formed of wire having an initially cylindrical shape having a predetermined diameter w, and wherein said ridge crest portions are spaced apart a distance C, where C is equal to C plus between about 5% and 10% of W.

The invention further comprises such a nail wherein there are four said reduced portions in said nail shank all formed of a generally regular arcuate concave shape, and having a radius R equal to between about C/2 and C/2 less 25%.

The invention further comprises such a nail wherein there are three grooves and wherein the grooves have a radius R equal to between C/2+25% and C/2+40%.

The invention further comprises such a nail wherein the reduced portions comprise generally flattened portions extending along the shank of said nail, between said ridges, and wherein said ridges comprise generally angular shapes in section.

The invention further comprises such a nail wherein the nail has a generally diamond shaped cross section, at least two opposed corners of said diamond shape cross section having planar surfaces parallel to and spaced from one another, whereby said nails may be placed in shank to shank contact with one another to form a strip.

The invention further comprises a nailing strip for use in a nailing applicator formed of nails of the type described.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF A SPECIFIC EMBODIMENT

Figure 1:
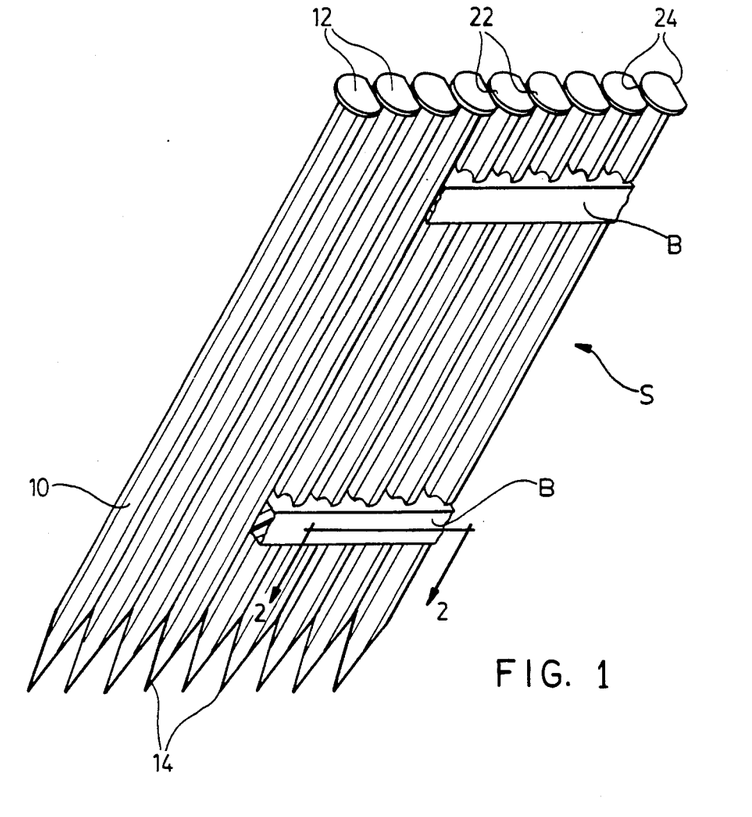
FIG. 1 is a perspective illustration of a nailing strip formed of nails in accordance with the invention.
Figure 2:
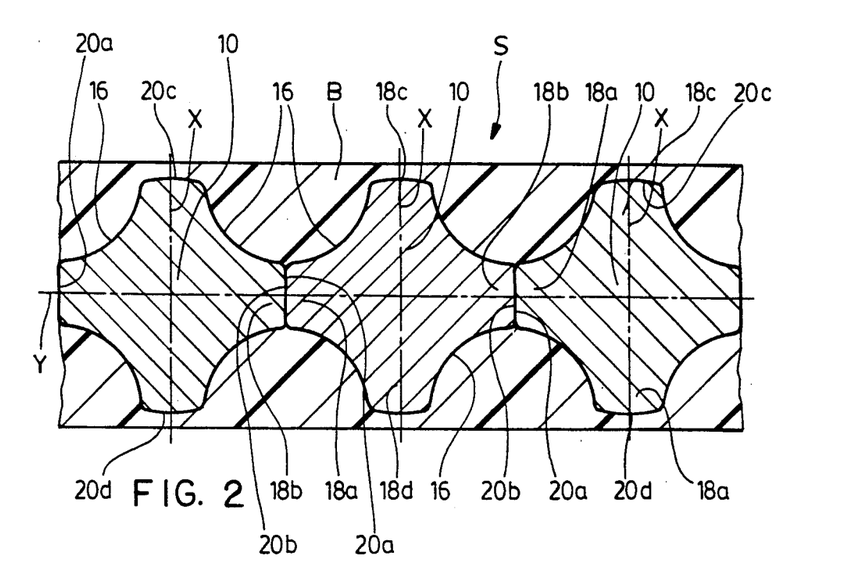
FIG. 2 is a section along the line 2—2 of FIG. 1.

Referring first of all to FIGS. 1 and 2, the nail in accordance with one embodiment of the invention will be seen to comprise generally a shank 10, a head 12, and a point 14. The shank 10, in this embodiment, comprises a continuous length of steel wire, which is originally of cylindrical shape, and which is formed into the shape shown in FIG. 1 by passing it through a suitable die of an equivalent cross-sectional shape.

As illustrated in FIG. 1, the shank 10 of the nail is formed with a plurality in this case four longitudinal reduced portions which in this case are in in the form of grooves 16, each being of generally indented concave shape, and each being radially spaced apart from the other in this case by about ninety degrees. While the invention is here exemplified with four such grooves, the invention is not specifically limited to a nail with four grooves and four grooves only. The invention is also applicable nails having a greater or lesser number of reduced portions and which as the following description proceeds, will be seen to be of various shapes which may be in the form of grooves, or simply of flattened sections.

The grooves 16 are formed longitudinally each being parallel with the central axis of the nail so that the nail presents a regular continuous cross-section along its length. Thus the nail will not rotate while it is being drive in.

Between each of the grooves 16, there is formed a raised ridge portion 18. Thus in the example shown there are four reduced portions on grooves 16 and four ridges 18 in this embodiment.

Figures 3, 4, 5:
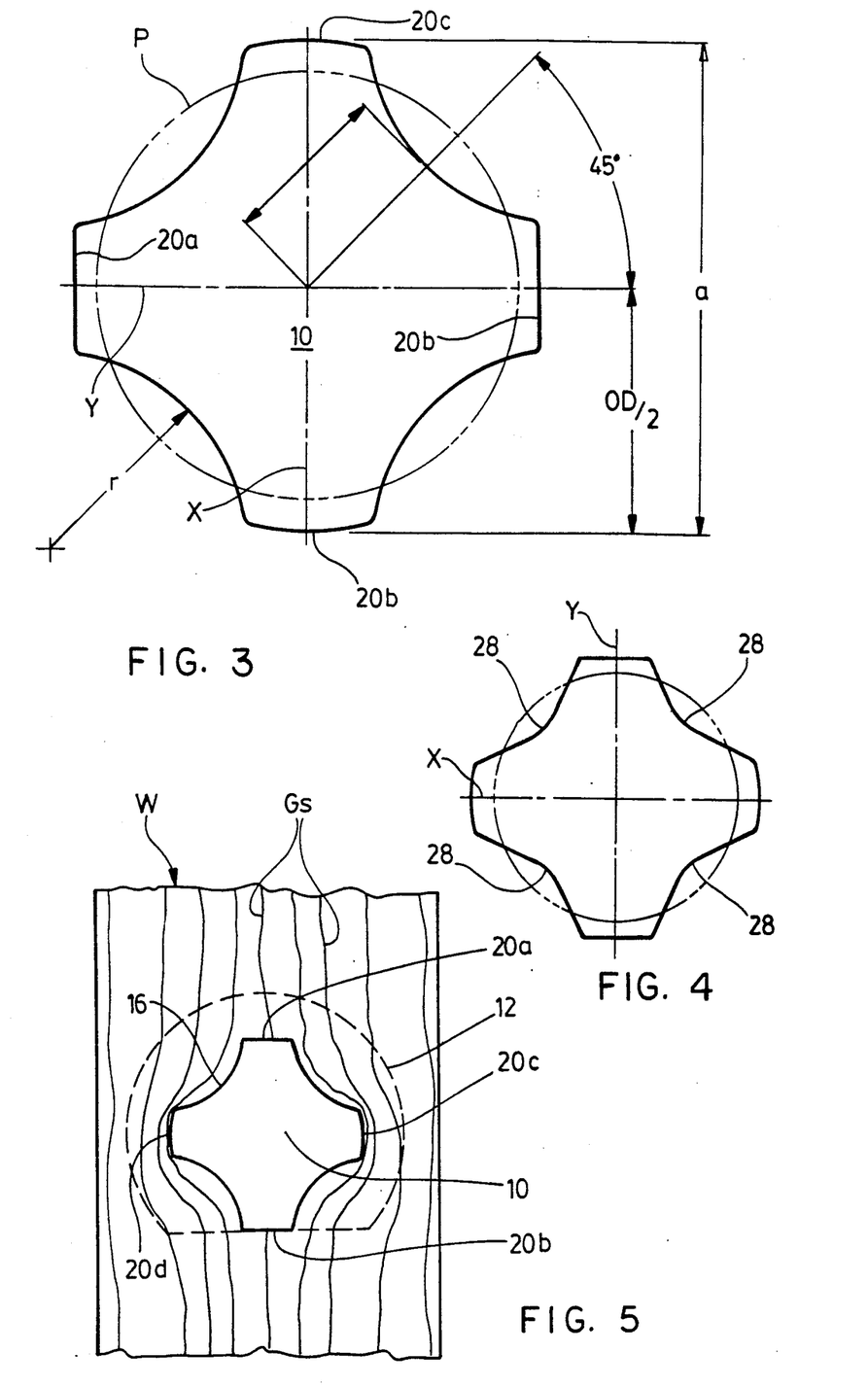
FIG. 3 is a schematic illustration showing a nail in accordance with the invention superimposed over a cylindrical wire of equivalent unit weight.
FIG. 4 is a section of a nail showing an alternate configuration for the grooves.
FIG. 5 is a schematic illustration showing a nail according to the invention, in a wooden workpiece.

The ridge portions 18 in this case are formed in opposed pairs. The first pair of ridge portions 18a–18b define generally planar ridge crest surfaces 20a–20b on the ridge crests. As illustrated for example in figures two and three, the cross-section of the nail maybe considered as having two transverse axes namely a first transverse axis X and a second transverse axis Y, which are normal to one another, and which intersect the longitudinal central axis of the nail.

These planar surface portions are on ridges which are separated from one another by one hundred and eighty degrees. Thus the planar surface portions in this example lie in planes which are spaced apart from one another, but which are generally parallel with one another, and which extend normal to the Y axis, and thus located at points spaced apart along the Y axis for reasons to be described below.

Figure 10:
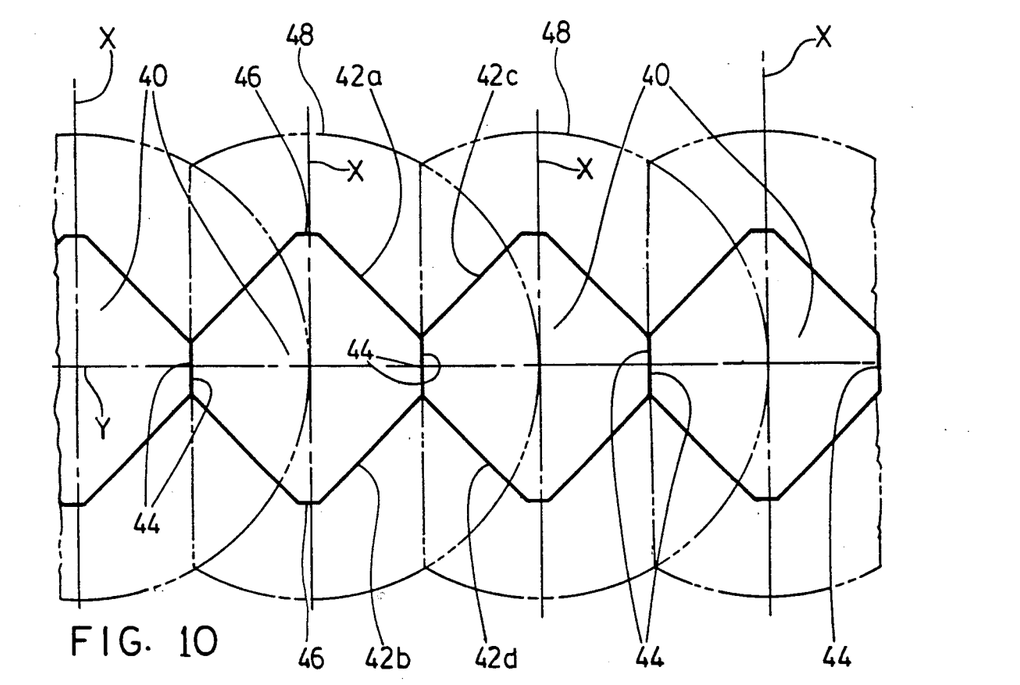
FIG. 10 is a sectional illustration corresponding to FIG. 2, showing an alternate embodiment of nail formed into a strip, and showing the heads thereof in phantom, and, FIG. 11 is a cut away perspective of a shank of a nail of the strip of FIG. 10.
Figure 11:
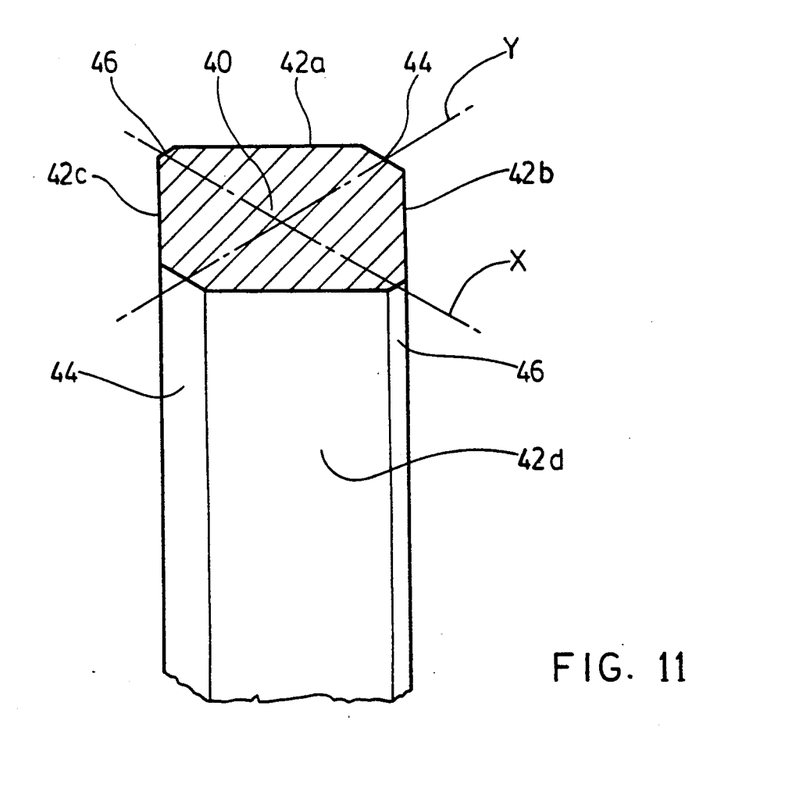

The other two ridges 18c and 18d are formed with crest portions 20c and 20d which may be of generally convex arcuate shape or may also be planar in some cases, or sharply angled FIG. 10 and 11 as desired. In this embodiment, the ridge portions are also formed one hundred and eighty degrees apart and ore oriented substantially normal to the X axis, and located at spaced points therealong, and which in this embodiment are respectively, and respectively ninety degrees offset from ridge portions 18a–18b, in this embodiment.

The arcuate crest portions of ridge portions 18C and D 20c–20d define a maximum spacing between them indicated by the letter C, and which will be seen to lie outside the phantom perimeter P of the cylindrical wire from which the nails are formed.

The heads 12 of the nails are what are called "clipped" heads, that is to say, they define a generally arcuate perimeter edge portion 22 and a generally linear perimeter edge portion 24. The arcuate portion 22 may be an arc of about two hundred and twenty to two hundred and fifty degrees more or less. The linear portion 24 may be more or less equivalent to a chord of such an arc. However this relationship is not critical and the arc may be less, or more, than that shown, and may or may not be an arc of a circle.

Preferably in accordance with this embodiment of the invention, the linear edge portion 24 will coincide substantially with the plane of one of the planar ridge crest portions 20a–20b. The arcuate peripheral edge 22 of the head 12 will extend outwardly beyond the three remaining ridge crest portions in the example shown.

Nails formed in this way are intended to be driven into a wooden workpiece with the planar ridge crest portions 20a–20b, being oriented facing in the leading and trailing directions respectively of the axis of the grain g of the wood. The arcuate crest portions 20c–20d are intended to be inserted so that they are located transversely "across" the axis of the grain of the wood, substantially as illustrated in FIG. 3. In this way, the arcuate crest portions produce the maximum displacement of the wood grain transversely of the longitudinal axis of the grain.

It will also be noted that in this configuration, when correctly inserted, the linear perimeter edge portion of the head of each nail will be lying along an axis substantially transverse to or "across", the longitudinal grain of the wood indicated by the letter g. The arcuate ridge crest portions 20c and 20d will be also lying wit the transverse X axis of the nail lying along an axis extending transversely of the longitudinal axis of the grain of the wood. In this way, maximum displacement of the grain of the wood is achieved by a nail of a given cross-section, and at the same time maximum holding power of the head itself is achieved, for that nail.

When the geometry of the nail in accordance with the invention is compared with a nail of a conventional cylindrical cross-section, of an equivalent weight of metal (FIG. 3 and 8), it will be seen that the circular configuration of the cylindrical nail indicated by the letter W has a lesser diameter than the spacing a between the arcuate ridge crest portions indicated as C. Consequently, the nails in accordance with the invention will have an increase in holding power which is roughly proportionate to the increase in the displacement of the grain of the wood, over nails of a cylindrical shape, of an equivalent weight of metal.

At the same time, even though clipped heads are used there is substantially no loss in holding power of the head itself.

It will also be apparent, in accordance with a further feature of the invention that the nails in accordance with the invention are particularly suited for assembly into nailing sticks. The planar surface portions, which are intended to be aligned along the longitudinal axis of the grain of the wood, are arranged so that they will in fact lie against one another in face-to-face abutting relation, when placed in a nailing stick. In this configuration, the "clipped" heads of the nails will overlap one another, but the planar faces of the planar surface portions will provide an excellent contact surface between one nail and the next adjacent nail in the strip. It will also be noted that the actual spacing between the planar portions of any given nail is substantially no greater than the diameter of the wire of a conventional cylindrical wire nail and is preferably somewhat less. Consequently, when nails in accordance with the invention are assembled into a nailing strip, in the same way as conventional cylindrical cross-section nails, it will be found that the same size of nailing strip will contain substantially at least the same number of nails, or even more nails in some cases. Consequently, there is no increase in downtime and loss of production caused by more frequent replacement of nailing sticks.

It will also be observed that because in the construction of the nail in accordance with the invention the reduced portions and ridges are arranged in a linear manner lying parallel to the central axis of the nail, that the nail itself does not have to rotate when being driven in. Consequently, the disadvantages known to be associated with the use of twisted wire nails in nailing applicating machines are not encountered.

The reduced portions or grooves themselves may be formed of a generally smooth concave radius, in which case such a radius may have a length indicated as r. The radius r may be substantially approximately the same as the radius of the cylindrical wire from which the nail is formed, with the center of the concave arc of each groove being offset outwardly from the center of the central axis of the nail by a distance of r plus between one-half r and r, depending upon the degree to which it is desired to displace the metal of the nail from the grooves into the ridges in any particular case.

In another case (FIG. 4) the grooves 28 may be made of a shallow obtuse indented angled V-shape, which may have certain advantages in producing a slightly greater displacement of metal into the ridges, and may have certain other advantages in practice.

The planar surfaces of the planar ridge crest portion may have a width S equal to between about 0.25 to 0.35 of the spacing C between the arcuate crest portions.

The foregoing explanation has been described above in connection with a nail having four ridges and four grooves. It will be appreciated that the invention is not restricted thereto. The invention is also applicable to a nail having for example three reduced portions and three ridges, or conceivably to a nail having more than four reduced portions and ridges.

Figure 6:
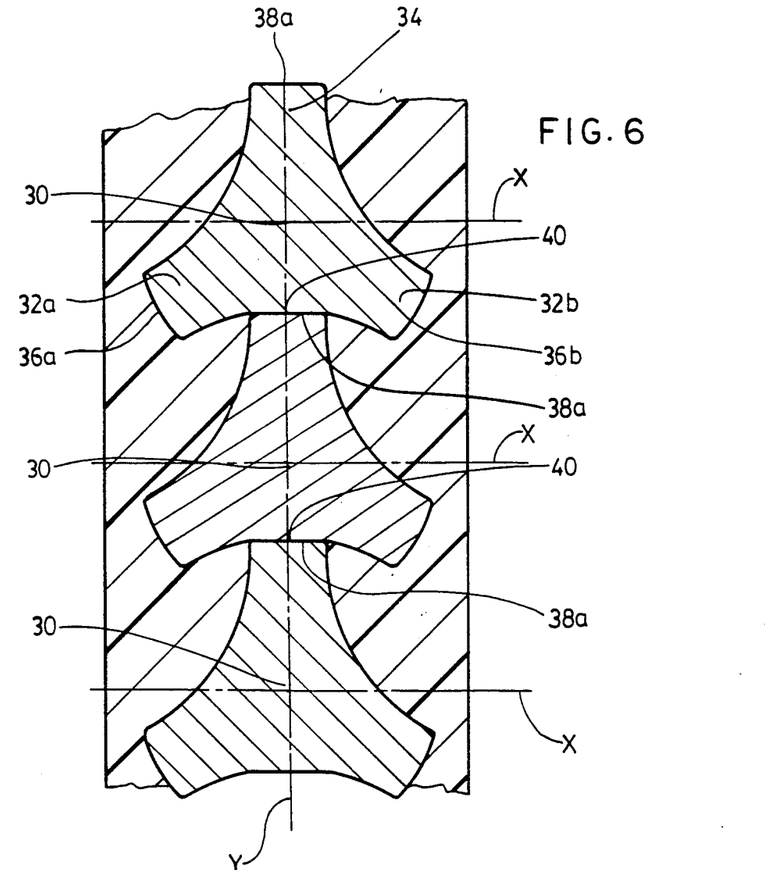
FIG. 6 is a section of an alternative form of nailing strip formed of an alternate form of nails in accordance with the invention.
Figure 7:
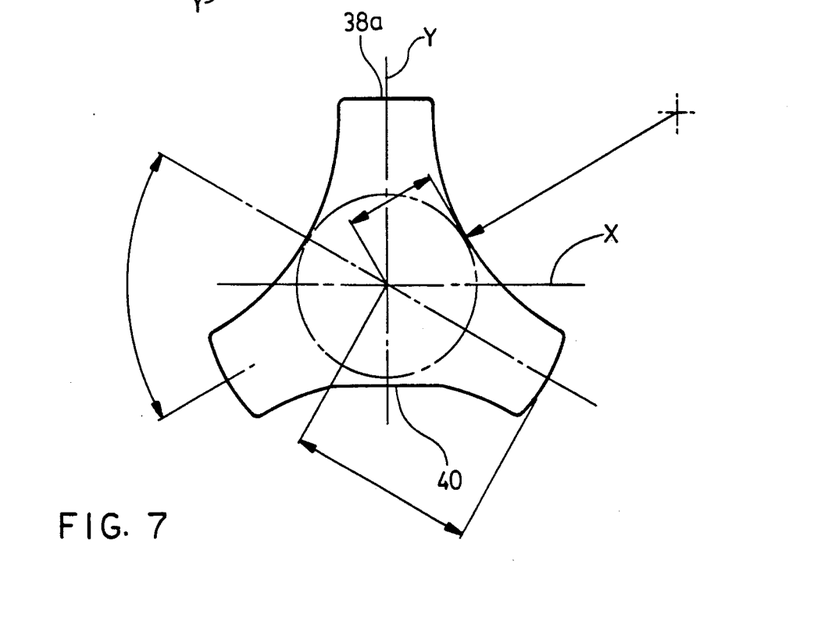
FIG. 7 is a section along the line 7—7 of FIG. 5 greatly enlarged.

In the embodiment shown in FIGS. 6 and 7, the nail has a shank indicated generally as 30. It will be seen to have only three ridges, namely two ridges 32A and 32B each having an arcuate ridge crest, and a ridge 34 having a planar ridge crest surface.

The surface of the nail opposite to ridge 34, and extending between the edges of the two ridges 32A, 32B presents an essentially planar surface 36.

FIG. 6 illustrates several of these nails formed into a nailing strip. It will be seen that the ridge 34 of one nail, having a planar ridge surface, is adapted to lie against a planar surface 36 of the next adjacent nail and so on.

The two ridges 32A, 32B having arcuate ridge crests extend on opposite sides of the nail at an obtuse angle.

Thus, provided the operator inserts these nails with the ridges 34 aligned longitudinally along the axis of the wood grain, and with the two ridges 32A, 32B lying more or less equally; transversely i.e. across the grain, then the nail will achieve the maximum displacement of the wood fibres transversely i.e. across the grain, thereby achieving the maximum effective hold possible for a nail of that given weight of wire.

Figure 8:
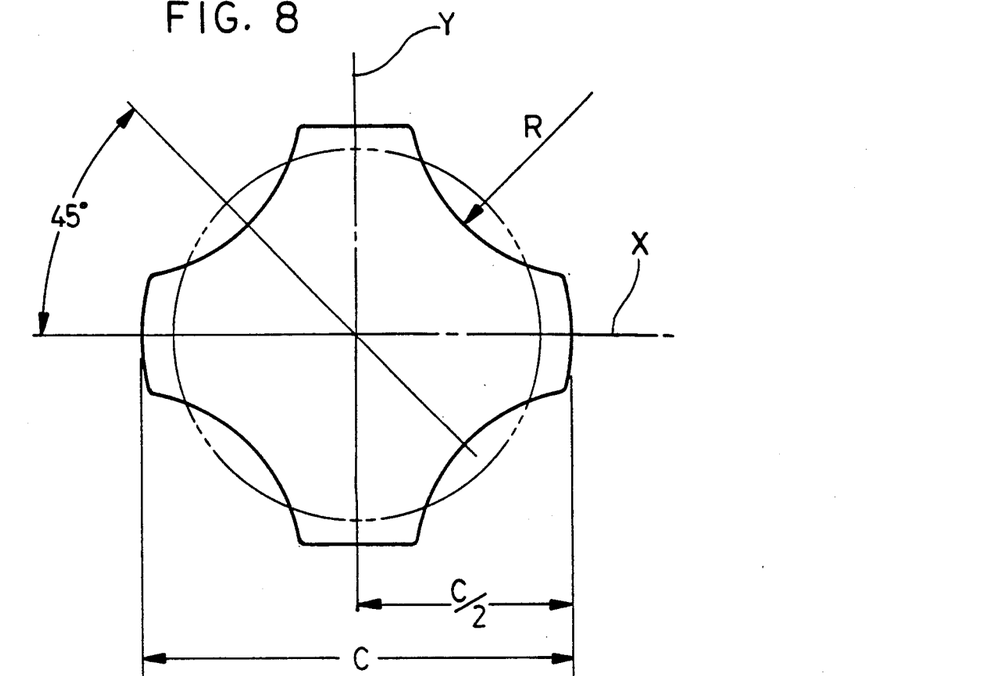
FIG. 8 is a schematic illustration showing the proportion of a typical four-groove nail.
Figure 9:
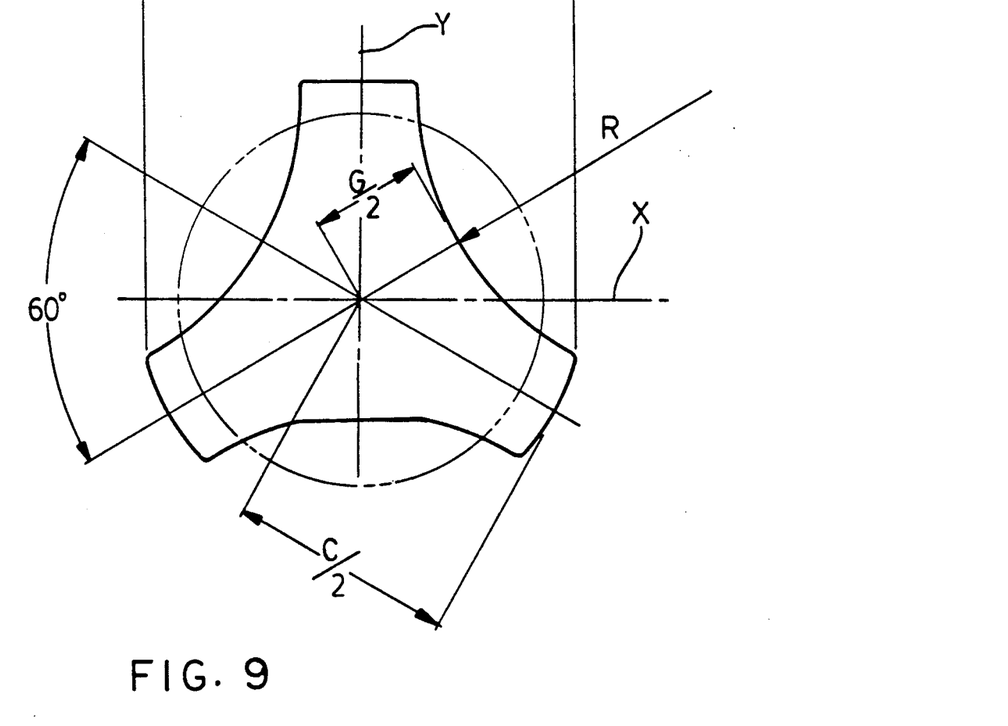
FIG. 9 is a schematic section corresponding to FIG. 8, showing the cross section of a typical three-groove nail.

The relationship of the various dimensions of a nail in accordance with the invention may be best understood from FIG. 3 and FIGS. 8 and 9 and will be approximately within the following ranges, that is to say : Four Groove Nail $$\frac{C/2}{G/2} = \frac{100}{60} - \frac{100}{55}$$

$$\frac{C/2}{R} = \frac{100}{70} - \frac{100}{100}$$

Three Groove Nail $$\frac{C/2}{G/2} = \frac{100}{50} - \frac{100}{65}$$

$$\frac{C/2}{R} = \frac{100}{125} - \frac{100}{140}$$

While the discussion above has generally described of a nail formed with reduced portions in the shape of grooves indented into the shank of the nail, it will be appreciated that the reduced portions do not have to be in the shape of a groove. The reduced portions can merely be flattened areas of reduced section. Such a form of nail as illustrated in FIGS. 10 and 11.

Such a nail will be seen to have a shank 40, having in this case four flattened reduced areas 42-*a-b-c-d*, giving the nail generally the shape of a diamond in cross section.

Where the flattened sides 42 *a,b* and 42*c-d* meet one another, flattened planar surfaces 44 are formed which are parallel with one another and are spaced apart on opposite sides of the shank. In this way, the planar areas 44 may thus be laid against one another in shank to shank engagement, so that the nails may be formed into a strip as shown in FIG. 10.

Where the surfaces 42*a*–42*c* and 42*b-d* meet, it will be seen that at the apex at what would be a corner, a small flattened area 46 is provided.

The dimension of the nail from one flattened area 46 to the other will be greater than the diameter of a cross cylindrical wire nail of an equivalent weight of wire. Thus the nail will have greatly increased holding power as compared with the cylindrical wire nail. At the same time, such nails can readily be formed into a nailing strip, and in fact given suitable geometry, for a given length of nailing strip, a greater number of the nails of FIGS. 10 and 11 may be accommodated in such a strip, than in the same length of nailing strip made up of cylindrical wire nails. This is because the distance between the two planar surfaces 44 is in this embodiment slightly less than the diameter of a cylindrical wire nail of an equivalent weight of wire.

The nails have clipped heads 48 as shown in phantom in FIG. 10.

The foregoing is a description of a preferred embodiment of the invention which is given here by way of example only. The invention is not to be taken as limited to any of the features as described, but comprehends all such variations thereof as come within the scope of the appended claims.

What is claimed is:

1. A nail containing a predetermined unit weight of metal per unit of length, equivalent to a cylindrical wire nail having a predetermined diameter W and perimeter P and an equivalent unit length, and said nail comprising:

a shank portion having a predetermined length, and having a regular shape along its length and defining a central longitudinal axis with a first transverse axis X and a second transverse axis Y normal to said X axis;

a point at one end of said shank portion;

four reduced portions on said shank portion extending longitudinally thereof from said point, and parallel to said central axis of said shank portion, said reduced portions being oriented to face along axes directed between said X and said Y axes and being spaced diametrically apart from one another and defining a dimension reduced relative to said predetermined diameter W whereby to lie inside said perimeter P;

two ridges formed between said reduced portions, defining ridge crest portions said ridge crest portions being spaced apart on opposite sides of said shank portion by a distance C, where C is equal to W plus between about 5 and 10% of W;

planar surface portions on said shank portion lying in predetermined spaced planes parallel to one another and oriented to lie along said Y axis whereby a said planar surface portion of one said nail may lie against a planar surface portion of a next adjacent nail in a strip, with said ridge crest portions extending from said shank outwardly from each said nail in said strip, on opposite sides of said strip and, a head on said end of said nail remote from said point.

2. A nail as claimed in claim 1 wherein said ridge portions define generally arcuate shaped ridge crest portions, said arcuate shaped ridge crest portions being located on opposite sides of said nail, spaced radially from said planar surface portions.

3. A nail as claimed in claim 1 wherein said head defines a linear edge and an arcuate edge said linear edge lying along an axis parallel to said planar ridge crest portion.

4. A nail as claimed in claim 1 wherein said reduced portions are formed as grooves of a generally regular arcuate concave shape, and having a radius R said radius R being equal to between about C and 0.7 C.

5. A nail as claimed in claim 1 wherein said planar surface portions are located on two of said ridge crest portions and wherein said nail comprises at least two further ones of said ridge crest portions said further ridge crest portions defining generally arcuate shaped crest portions said arcuate shaped crest portions being located on opposite sides of said nail, and wherein said head defines a linear edge said linear edge of said head lies in a plane spaced from one said planar ridge crest portion, and substantially co-incident with the plane of the other said planar ridge crest portion.

6. A nail as claimed in claim 1 wherein said reduced portions comprise generally flattened regions formed along said shank, between said ridges, and wherein said ridges comprise generally angular raised portions formed along said shank.

7. A nail as claimed in claim 6 wherein said nail has a shank of generally diamond shaped cross section, with flattened corners.

8. A nail as claimed in claim 7 wherein said nail has two planar surfaces on opposite sides of said nail shank, lying in planes parallel to one another and spaced apart from one another, said planar surfaces being adapted to be placed in shank to shank engagement, when said nails are formed into a strip.

9. A nail containing a predetermined unit weight of metal per unit of length, equivalent to a cylindrical wire nail having a predetermined diameter W and perimeter P and an equivalent unit length, and said nail comprising:
  a shank portion having a predetermined length, and having a regular shape along its length and defining a central longitudinal axis with a first transverse axis X and a second transverse axis Y normal to said X axis;
  a point at one end of said shank portion;
  three reduced portions on said shank portion extending longitudinally thereof from said point, and parallel to the said central axis of said shank portion, said two of said reduced portions being oriented to face along axes directed between said X and said Y axes and defining a radial dimension reduced relative to one half said predetermined diameter W whereby to lie inside said perimeter P and a third one of said reduced portions being oriented to face along said Y axis;
  two ridges formed adjacent said reduced portions, defining ridge crest portions said ridge crest portions being spaced radially from said central axis of said shank portion by a distance greater than one half said diameter W whereby to lie outside said perimeter P;
  a third ridge located between said two of said reduced portions and oriented to face along said Y axis, in a direction opposite to said third one of said reduced portions;
  planar surface portions on said shank portion lying in predetermined spaced planes parallel to one another and oriented to lien along said Y axis whereby a said planar surface portion of one said nail may lie against a said planar surface portion of a next adjacent nail in a strip, with said two ridge portions extending from said shank outwardly from each said nail in said strip, on opposite sides of said strip and,
  a head on said end of said nail remote from said point.

10. A nail as claimed in claim 9 wherein there are two said planar surface portions, one of said planar surface portions being formed on said third one of said ridge portions, and lying in a plane normal to said Y axis, and said other of said planar surface portions being formed within said third one of said reduced portions and lying in a plane normal to said Y axis.

11. A nail as claimed in claim 9 wherein said two of said ridge portions are oriented so as to face along axes spaced apart of about by an angle 20 degrees, and said axes lying between said X and Y axes, on opposite sides of said third reduced portion.

12. A nailing strip comprising a plurality of nails juxtaposed to one another in contact with one another, said nails in said nailing strip each containing a predetermined unit weight of metal per unit of length, equivalent to a cylindrical wire nail having a predetermined diameter W and perimeter P and an equivalent unit length, and said nail comprising:
  a shank portion having a predetermined length, and having a regular shape along its length and defining a central longitudinal axis with a first transverse axis X and a second transverse axis Y normal to said X axis;
  a point at one end of said shank portion;
  three reduced portions on said shank portion extending longitudinally thereof from said point, and parallel to the said central axis of said shank portion, said two of said reduced portions being oriented to face along axes directed between said X and said Y axes and defining a radial dimension reduced relative to one half said predetermined diameter W whereby to lie inside said perimeter P and a third one of said reduced portions being oriented to face along said Y axis;
  two ridges formed adjacent said reduced portions, defining ridge crest portions said ridge crest portions being spaced radially from said central axis of said shank portion by a distance greater than one half said diameter W whereby to lie outside said perimeter P;
  a third ridge located between said two of said reduced portions and oriented to face along said Y axis, in a direction opposite to said third one of said reduced portions;
  planar surface portions on said shank portion lying in predetermined spaced planes parallel to one another and oriented to lie along said Y axis whereby a said planar surface portion of one said nail may lie against a said planar surface portion of a next adjacent nail in a strip, with said two ridge portions extending from said shank outwardly from each said nail in said strip, on opposite sides of said strip and,
  a head on said end of said nail remote from said point; and,
  bonding means bonding said nails to one another in said strip, with said planar surface portions of one nail in surface to surface contact with adjacent planar surface portions of adjacent nails in said strip whereby to form the same into said strip with said Y axis being median to and lying in said strip.

13. A nailing strip comprising a plurality of nails juxtaposed to one another in contact with one another, said nails in said nailing strip each containing a predetermined unit weight of metal per unit of length, equivalent to a cylindrical wire nail having a predetermined diameter W and perimeter P and an equivalent unit length, and said each nail comprising:

a shank portion having a predetermined length, and having a regular shape along its length and defining a central longitudinal axis with a first transverse axis X and a second transverse axis Y normal to said X axis;

a point at one end of said shank portion;

four reduced portions on said shank portion extending longitudinally thereof from said point, and parallel to said central axis of said shank portion;

said reduced portions comprising generally flattened surfaces formed along said nail shank between said ridges and facing along axes directed between said X and Y axes;

ridges formed between said reduced portions, defining ridge crest portions said ridge crest portions comprising generally angular raised portions;

planar surface portions formed on said nail shank on opposite sides thereof in planes parallel to one another normal to said Y axis and spaced apart along said Y axis, said planar surface portions of respective nails being in shank to shank engagement with adjacent nails in said strip;

a head on said end of said nail remote from said point; and, bonding means bonding said nails to one another in said strip, with said planar surface portions of one nail in surface to surface contact with adjacent planar surface portions of adjacent nails in said strip whereby to form the same into said strip with said Y axis being median to and lying in said strip.

* * * * *